United States Patent

Katzer et al.

[11] Patent Number: 5,884,943
[45] Date of Patent: Mar. 23, 1999

[54] SLEEVE OF A GARDENING TOOL, PARTICULARLY COUPLING SLEEVE OF A QUICK HOSE COUPLING

[75] Inventors: Johann Katzer, Neu-Ulm; Wolfgang Lindermeir, Untermarchtal, both of Germany

[73] Assignee: Gardena Kress + Kastner GmbH, Germany

[21] Appl. No.: 675,621

[22] Filed: Jul. 3, 1996

[30] Foreign Application Priority Data

Jul. 22, 1995 [DE] Germany .......................... 19526884.9

[51] Int. Cl.⁶ .................................................. F16L 35/00
[52] U.S. Cl. ................................ 285/38; 285/93; 285/316
[58] Field of Search .............................. 285/38, 316, 93, 285/908

[56] References Cited

U.S. PATENT DOCUMENTS

| | | | |
|---|---|---|---|
| 2,246,404 | 6/1941 | Ross | 285/908 X |
| 3,413,017 | 11/1968 | Hughey | 285/38 |
| 4,007,909 | 2/1977 | Buseth et al. | |
| 4,058,031 | 11/1977 | Magarian | 285/38 X |
| 4,416,166 | 11/1983 | Jannard | 74/551.9 |
| 4,425,390 | 1/1984 | Changani et al. | 285/93 X |
| 4,837,892 | 6/1989 | Lo | 16/116 R |
| 4,951,533 | 8/1990 | Hillinger | 81/177.1 |
| 5,027,511 | 7/1991 | Miller | 30/85 |
| 5,127,678 | 7/1992 | Henning | 285/38 X |
| 5,158,327 | 10/1992 | Rowe | 285/38 |
| 5,270,967 | 1/1994 | Varrin | 285/93 |
| 5,390,572 | 2/1995 | Gokhar et al. | 285/38 X |
| 5,451,031 | 9/1995 | Purvis et al. | 285/38 X |
| 5,522,111 | 6/1996 | Kelsay | 15/235.4 |
| 5,601,003 | 2/1997 | Amtenbrink et al. | 81/489 |
| 5,623,890 | 4/1997 | Lenske | 285/93 X |

FOREIGN PATENT DOCUMENTS

| | | | |
|---|---|---|---|
| 1775302 | 5/1971 | Germany . | |
| 9010211 | 9/1990 | Germany . | |
| 785282 | 10/1957 | United Kingdom . | |
| 2233724 | 1/1991 | United Kingdom | 285/38 |

*Primary Examiner*—Dave W. Arola
*Attorney, Agent, or Firm*—Quarles & Brady

[57] ABSTRACT

On a sleeve for a gardening tool, for example a quick coupling (12), surface parts of a flexible, soft and grip-promoting material (24) are provided in differing individual sections. These are applied in a two-component injection molding method and may also comprise special bump rims (27). By a differing color design and alternating exposure of the surface of the two composite materials of base body (17) and additional element (24) lettering, marking or configuring the surface may be achieved.

4 Claims, 2 Drawing Sheets

SLEEVE OF A GARDENING TOOL, PARTICULARLY COUPLING SLEEVE OF A QUICK HOSE COUPLING

TECHNICAL FIELD AND BACKGROUND OF THE INVENTION

The invention relates to a sleeve of a gardening tool, particularly an actuatable coupling sleeve of a quick hose coupling comprising a base body of a relatively hard plastics material and an additional element of flexible, rubber-like material constituting a surface section of the sleeve.

From DE-U-90 10 211.8 one such sleeve is known on which a ring-shaped band of a soft material is wound on a ring-shaped recess. This material may be a rubber material and feature a rough outer surface.

SUMMARY OF THE INVENTION

The object of the invention is to define a sleeve permitting the provision of additional elements promoting good grip and preventing damage at positions established ergonomically and on the basis of the circumstances for use. This object is achieved in accordance with the invention by the additional element being non-releasably connected to the base body.

The additional element thus enters into a direct surface-to-surface bonded connection with the base body which permits providing surface sections which e.g. do not fully surround the sleeve, also at least in part and which may also be totally separated from each other. These may be, for instance, finger scallops which themselves also feature a specific surface structure. Separately from these and also in the region of these finger scallops, design and indicating elements may also be provided which form the additional element. Thus, for example, the additional element may form surface sections which alternate with the surface of the base body such that symbols, letters or pictorial elements are formed therefrom, e.g. indicator arrows for operation, identifications of a certain type of coupling or the like. For this purpose base bodies may preferably have differing colors on the additional element. It is also preferred in wet circumstances that the the additional element has good-grip and also in particular non-aging material properties to retain its flexibility and good grip, e.g. in wet hand garden use, even after lengthy exposure to solar radiation.

In addition to the possibility of a sectionwise definition a surrounding configuration of a part of the additional element may also be provided, for instance, in the portion of one end face of the sleeve. As a result of this an edge guard may be created which is especially important in the case of gardening tools which are often dragged behind the user and bump against stones, bed verges etc. preferably by these edge faces.

The additional element may be injection molded in dished or fluted recesses of the base body, this resulting in the non-releasable connection at least for normal operation. One particularly preferred type of manufacture is achieved by a two-component injection molding procedure. In this method in a second phase the second component, namely the softer plastics material of the additional element, is injected onto the the base body, consisting of a relatively hard plastics material which is still hot but already hard in the injection mold, the second component thereby fusing to the base body to form a non-releasable connection.

The method of manufacture comprises the steps od producing the base body by plastics injection molding from a relatively hard thermoplastic including recesses formed with respect to the final shape into which a flexible, rubber-like thermoplastic is injected in bonding connection with the material of the base body directly following when the material of the base body is still hot.

It will be appreciated that due to the invention the possibility is created of producing the base body from a material which is relatively hard and having accordingly the precision and permanent shape necessary for its function, for instance as the actuating sleeve of a quick-coupling, no special emphasis needing to be placed on the flexibility and impact strength of the material and just as little on the grip-promoting surface. The latter is then provided by means of the additional element, whereby positions particularly exposed to impact may be provided with the flexible additional element, again with virtually complete freedom of design and with no restriction to an exclusively surrounding application. Accordingly, the sleeve is also suitable for other gardening tools, for example, as the actuating sleeve of garden sprinklers, the screw sleeves of hose connectors etc. It is also possible to make use of the flexible properties of the additional element for other purposes, for instance as a kind of flexible diaphragm covering gaps or recesses necessitated by design which are subjected to movement, for example, at the end of such an actuating sleeve, thus thwarting soilage of parts important to proper functioning.

The individual, virtually separate sections may also be arranged particularly effective and conducive to manufacture so that all are in conjunction as regards material. This may even be assured when portions separate from each other are evident on the surface of the sleeve. In this case the joint between between the individual elements may be produced by jointing sections running beneath the surface. Thus, in this way, for example, a surrounding bump rim may join several separate finger scallops to each other concealed.

The invention thus enables surface parts of a flexible, soft and grip-promoting material to be provided in differing single sections on a sleeve for a garden tool, for example a quick-coupling. These are applied by means of a two-component injection molding method and may also include separate bump rims. By differing the color arrangement and alternating the exposure of the surface of the two composite materials of base body and additional element a lettering, marking or special design of the surface may also be achieved.

These and further features are evident not only from the claims but also from the description and the drawings, each of the individual features being achieved by themselves or severally in the form of subcombinations in one embodiment of the invention and in other fields and may represent advantageous aspects as well as being patentable in their own right, for which protection is sought in the present.

It will be appreciated that dividing the application into separate sections as well as under intermediate headings does not restrict the reading in its validity in general.

BRIEF DESCRIPTION OF THE DRAWINGS

Example embodiments of the invention are explained in more detail in the following and illustrated in the drawings in which.

DESCRIPTION OF THE EXAMPLE EMBODIMENT OF FIGS. 1 TO 4

Figure 1:
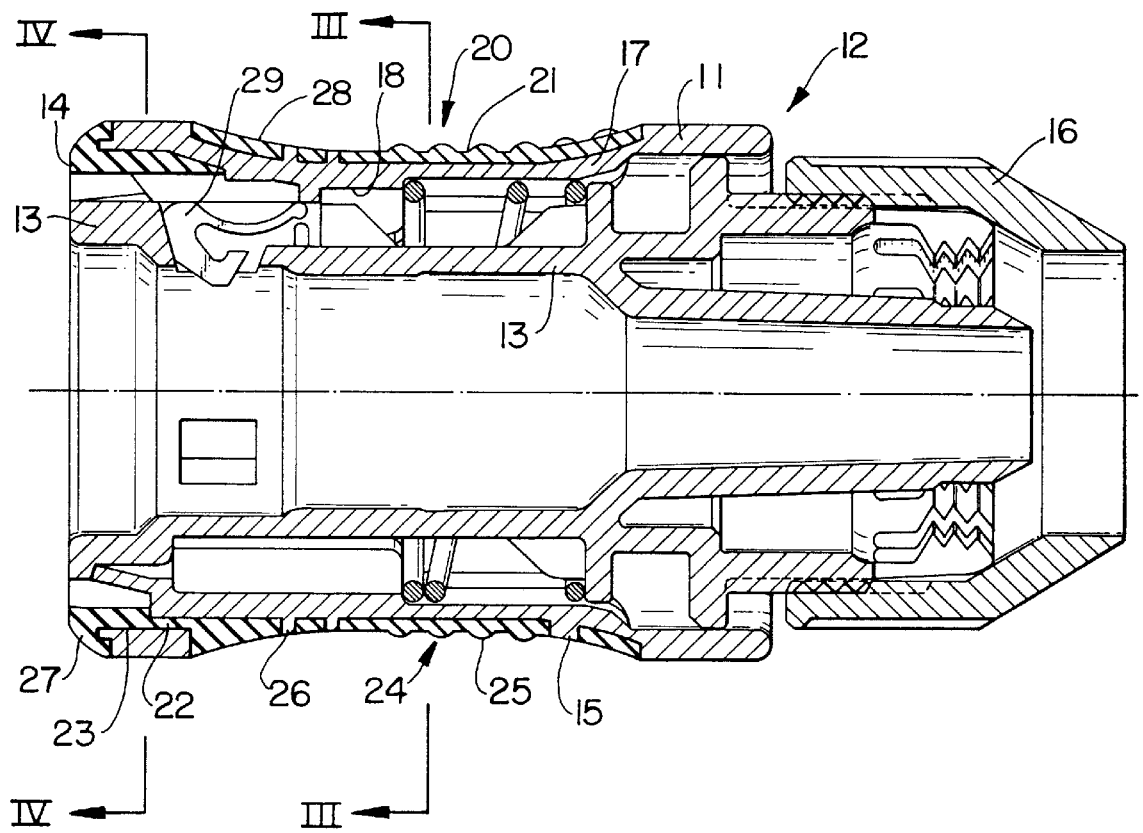
FIG. 1 is a longitudinal section through an actuating sleeve of a quick hose coupling.
Figure 2:
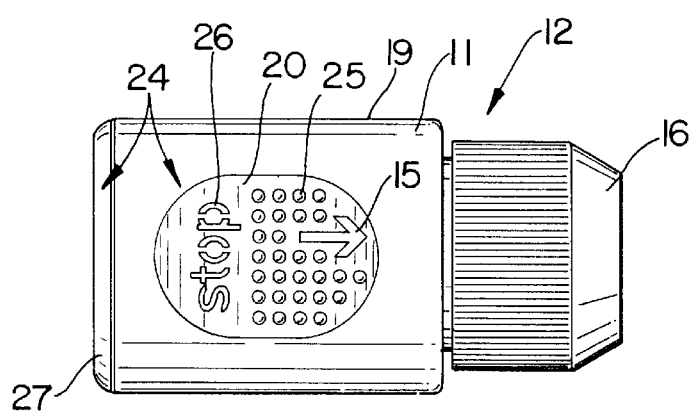
FIG. 2 is an outer view of the sleeve.

The FIGS. 1 to 4 show a sleeve 11 which is the actuating sleeve of a quick hose coupling 12. In the main body 13 of the hose coupling 12 spring clasp cams 29 are guided swivably movable which clasp and retain a connector nipple (not shown) introduced at the end face 14. On actuation of the sleeve 11 by it being shifted axially in the direction of the arrow 15 the clasping cams 29 free the connector nipple and thus release the coupling. By means of a hose coupling which contains a screw mounting nut 16 a hose is connected to the opposite end. As regards the mechanical details of the hose coupling reference is made to German patent 1 775 302, also for the purpose of disclosure.

The sleeve has a substantially cylindrical base body 17 made of a relatively hard, rigidly shaped thermoplastic material. The sleeve provided open at both ends and including a large opening 18 differingly ribbed on the inside, has several scalloped depressions 20 in its cylindrical surface 19; in the region of which additional recesses 21 are provided. These recesses 21 are joined to an annular recess 23 by jointing sections 22 provided in the portion of the end face 14 of the sleeve, the jointing sections running thereby beneath the surface 19 of the sleeve 11.

In these recesses 21, 23 an additional element 24 is anchored which is defined in these recesses non-releasably or bonded surfacewise, for example as a kind of fused connection. Its surface is contoured so that in the region of the finger scallops 20 an oval dished configuration having a plurality of semi-globular projections 25 is formed. The thickness of the additional element is of the same order as that of base body wall standing beneath or above, i.e. it being of a not inconsiderable thickness.

The recesses 21 are configured so that at some locations ribs of the base body materialize which have the shape of letters 26 or symbols (arrow 15). These are not covered by the additional element 24 so that they remain standing in the color and structure of the base body 17, the material of which is differently tinted to that of the additional element.

The additional element is made of a flexible, rubber-like material, preferably also of a thermoplastic material.

At the edge face 14 the flexible, rubber-like material of the additional element also creates in this arrangement a ring forming a surrounding flexible bump rim 27. The surface 28 of the additional element is preferably relatively rough, but in any case not of high-gloss quality so as to have a grip-promoting structure.

Figure 3:
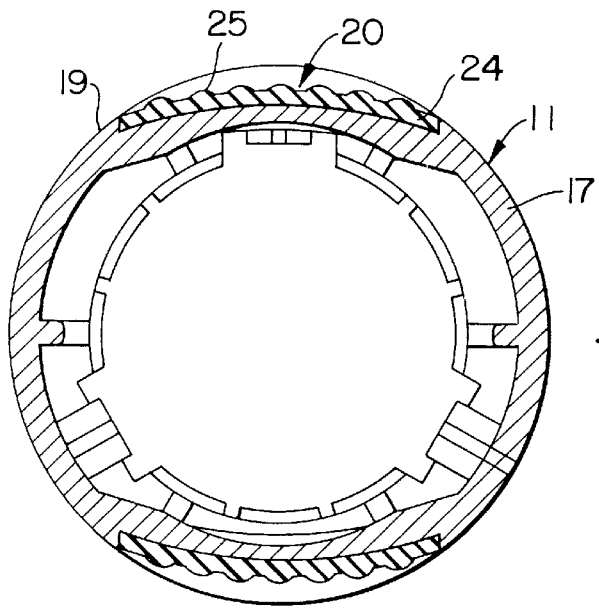
FIG. 3 is a cross-section along the line III in FIG. 1.
Figure 4:
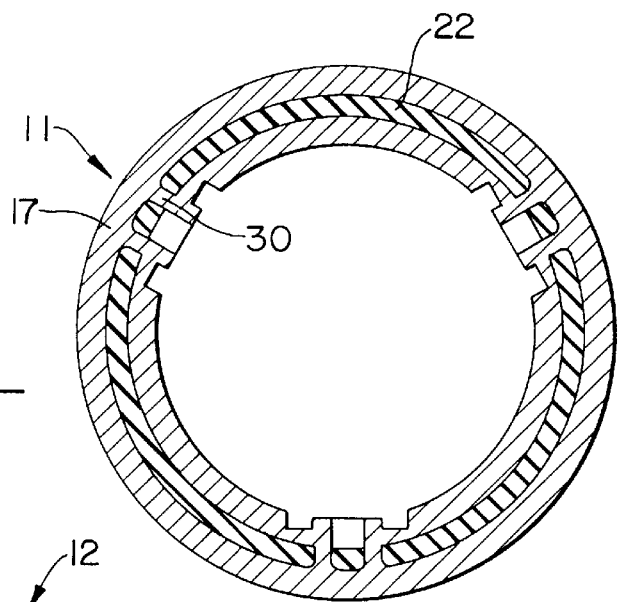
FIG. 4 is a cross-section along the line IV in FIG. 1

The FIGS. 3 and 4 show the surface of the dish 20, which is flattened with respect to the cylindrical shape, and the jointing sections 22 guided in the interior of the sleeve. These are interrupted peripherally by lands 30 which assure the cohesiveness of the base body. This intermeshed structure too, ensures a firm, non-releasable connection between base body and additional element.

MANUFACTURE

The manufacturing procedure is as follows: into a plastics injection mold, the cavity shape of which corresponds to the shape of the base body 17, the relatively hard plastics material is injected for the base body. Following hardening thereof the mold cavity is changed in shape e.g. by pulling corresponding spools and/or the introduction of other mold limiting parts so that the outer shape of the sleeve including the additional element 25 is then surrounded. However, also feasible is the transfer of the base body into another injection mold having the corresponding final shape of the sleeve. After this, whilst the material of the base body is still hot, the also thermoplastic melt material for the additional element 24 is injected which fills the then vacant cavities and makes use of the recesses 21 as a part of its injection mold, the latter sticking to the former as a kind of fusion. Once the material of the additional element has hardened the mold is opened and the finished sleeve ejected.

It is to be noted in this respect that the material is able to flow through the jointing sections 22 so that as regards gating and material distribution maximum freedom exists.

DESCRIPTION OF EMBODIMENT AS PER FIG. 5

Figure 5:
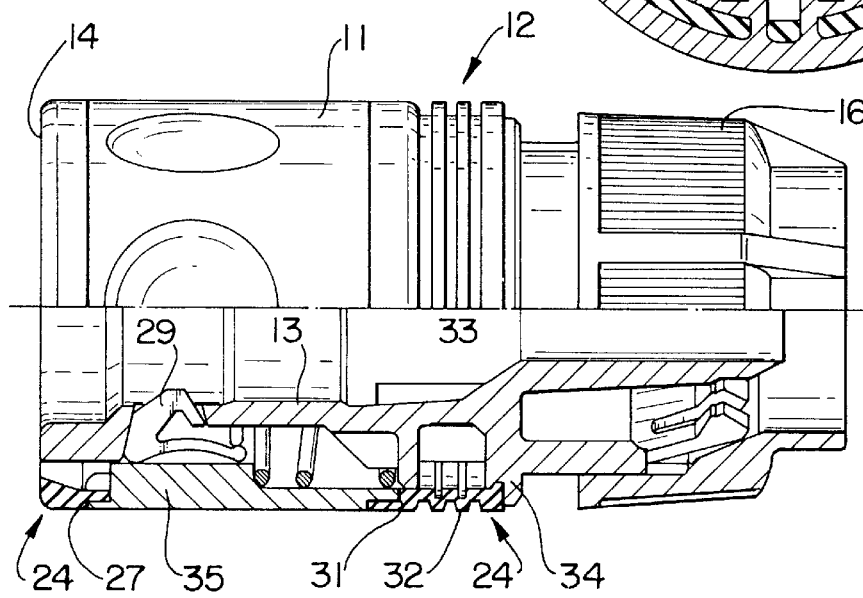
FIG. 5 is a partial longitudinal section through a quick hose coupling and its actuating sleeve.

In FIG. 5 a hose coupling 12 is depicted, the sleeve 11 of which comprises two sections of additional elements which are not jointed to each other, the items involved being the end face bump rim 27 and a section 31 of the additional element 24 provided at the other end face of the sleeve 11, both of which fully surround the sleeve. Adjoining the section 31 is a bellows-type covering section 32 which covers the gap 33 between the sleeve 11 and a flange 34 of the main body 13 of the hose coupling and to which flange 13 is connected where it may be defined, for example, in a snap-lock connection. In axially actuating the sleeve 11 to uncouple it (clockwise in FIG. 5) the bellows-type covering section is telescoped together. It will be appreciated that a projection 35 on the sleeve then allows the clasp cam 29 to deflect outwardly to produce uncoupling.

The sections 27, 31 of the additional element 24 may be secured to the sleeve in the manner as described. Here too, the additional element could be provided in the region of the finger scallops.

What is claimed is:

1. A sleeve of a gardening tool, including particularly an actuable coupling sleeve of a quick hose coupling, comprising:

a base body constructed from a hard plastic material and having dish-like recesses;

at least one grippable contoured surface grip section molded in each of said recesses;

a bump rim surrounding an end face of said sleeve;

the base body having surface sections between the grip sections and the bump rim;

said grip sections and said bump rim consisting of an integral, unitary molded piece of flexible and rubber-like plastic material, said integral, unitary molded piece having at least one jointing section situated beneath the surface sections and joining the grip sections to the bump rim; and, the materials of said integral, unitary piece and said base body being fused together in non-releasable manner by two component thermoplastic injection molding.

2. The sleeve as set forth in claim 1, wherein surface sections of said grip section and of said base body alternate to form a letter, numeral, symbol, or combination thereof.

3. The sleeve as set forth in claim 1, wherein said grip sections and said base body have different colors.

4. The sleeve as set forth in claim 1, wherein said integral piece is constructed from a durable, grip-promoting material.

* * * * *